(12) United States Patent
Kawanishi

(10) Patent No.: US 9,864,505 B2
(45) Date of Patent: Jan. 9, 2018

(54) TOUCH INPUT APPARATUS AND PORTABLE ELECTRONIC DEVICE INCLUDING SAME

(71) Applicant: KYOCERA CORPORATION, Kyoto (JP)

(72) Inventor: Hiroyoshi Kawanishi, Daito (JP)

(73) Assignee: KYOCERA CORPORATION, Kyoto (JP)

( * ) Notice: Subject to any disclaimer, the term of this patent is extended or adjusted under 35 U.S.C. 154(b) by 24 days.

(21) Appl. No.: 14/507,042

(22) Filed: Oct. 6, 2014

(65) Prior Publication Data

US 2015/0026634 A1  Jan. 22, 2015

Related U.S. Application Data

(63) Continuation of application No. 12/679,666, filed as application No. PCT/JP2008/067479 on Sep. 26, 2008, now abandoned.

(30) Foreign Application Priority Data

Sep. 28, 2007 (JP) ................................ 2007-254851

(51) Int. Cl.
*G06F 3/041* (2006.01)
*G06F 3/048* (2013.01)
(Continued)

(52) U.S. Cl.
CPC .......... *G06F 3/0488* (2013.01); *G06F 1/1616* (2013.01); *G06F 1/1643* (2013.01);
(Continued)

(58) Field of Classification Search
CPC ....... G06F 3/041; G06F 3/0484; G06F 3/0485
See application file for complete search history.

(56) References Cited

U.S. PATENT DOCUMENTS 4,972,496 A  11/1990  Sklarew
5,543,588 A  8/1996  Bisset et al.
(Continued)

FOREIGN PATENT DOCUMENTS

GB  2351215  12/2000
JP  06-168068 A  6/1994
(Continued)

OTHER PUBLICATIONS

Office Action dated Feb. 20, 2014 from corresponding Japanese Patent Application No. 2013-111276, 4 total pages.
(Continued)

*Primary Examiner* — Afroza Chowdhury
(74) *Attorney, Agent, or Firm* — Duane Morris LLP

(57) ABSTRACT

A portable electronic device includes a touch input apparatus including a touch panel installed on a surface of a display, the touch panel has a lead part projecting at the end of a detecting section, which includes a matrix area A where X value detection lines and Y value detection lines are arranged in matrix, and a lead area B where a plurality of lead lines extending from the matrix area A in the same direction as the X value detection lines to reach the lead part are arranged, wherein a first touch input section is formed by the matrix area A of the touch panel, and a second touch input section is formed by the lead area B.

3 Claims, 4 Drawing Sheets

(51) Int. Cl.

| | |
|---|---|
| *G06F 3/0488* | (2013.01) |
| *G06F 1/16* | (2006.01) |
| *H04M 1/23* | (2006.01) |
| *G06F 3/0481* | (2013.01) |
| *G06F 3/0484* | (2013.01) |
| *G06F 3/0485* | (2013.01) |
| *H04M 1/02* | (2006.01) |

(52) U.S. Cl.
CPC ............ *G06F 1/1647* (2013.01); *G06F 3/041* (2013.01); *G06F 3/0412* (2013.01); *G06F 3/0416* (2013.01); *G06F 3/0484* (2013.01); *G06F 3/0485* (2013.01); *G06F 3/04817* (2013.01); *H04M 1/0266* (2013.01); *H04M 1/23* (2013.01); *H04M 1/0214* (2013.01); *H04M 2250/22* (2013.01)

(56) References Cited

U.S. PATENT DOCUMENTS

| | | | | |
|---|---|---|---|---|
| 5,589,856 | A | | 12/1996 | Stein et al. |
| 6,025,644 | A | * | 2/2000 | Imaeda ............... G02F 1/13452 257/678 |
| 6,198,481 | B1 | | 3/2001 | Urano et al. |
| 6,466,202 | B1 | | 10/2002 | Suso et al. |
| 6,903,729 | B2 | | 6/2005 | Nakanishi et al. |
| 7,123,243 | B2 | | 10/2006 | Kawasaki et al. |
| 7,289,102 | B2 | * | 10/2007 | Hinckley et al. ............. 345/156 |
| 7,432,911 | B2 | | 10/2008 | Skarine |
| 7,602,378 | B2 | | 10/2009 | Kocienda et al. |
| 7,937,123 | B2 | * | 5/2011 | Hamamura .......... H04B 1/3833 455/550.1 |
| 7,970,438 | B2 | * | 6/2011 | Yoon et al. .................... 455/566 |
| 7,986,309 | B2 | | 7/2011 | Kim |
| 8,044,932 | B2 | | 10/2011 | Ryu et al. |
| 8,106,887 | B2 | * | 1/2012 | Park .................... H04M 1/0214 345/168 |
| 8,115,740 | B2 | * | 2/2012 | Wang .................. G06F 3/04886 345/173 |
| 8,128,461 | B1 | | 3/2012 | O'Moore et al. |
| 8,134,534 | B1 | | 3/2012 | Gettemy |
| 9,215,306 | B2 | * | 12/2015 | Kim .................... H04W 52/027 |
| 2001/0006389 | A1 | | 7/2001 | Nanba et al. |
| 2002/0115472 | A1 | * | 8/2002 | Andress ............... G06F 1/1626 455/556.1 |
| 2002/0135565 | A1 | | 9/2002 | Gordon et al. |
| 2002/0175901 | A1 | | 11/2002 | Gettemy |
| 2002/0186252 | A1 | * | 12/2002 | Himmel et al. .............. 345/787 |
| 2003/0067449 | A1 | | 4/2003 | Yoshikawa et al. |
| 2003/0071796 | A1 | | 4/2003 | Nakanishi et al. |
| 2003/0125081 | A1 | * | 7/2003 | Boesen ................ G06F 1/1616 455/556.1 |
| 2003/0184528 | A1 | | 10/2003 | Kawasaki et al. |
| 2003/0234771 | A1 | * | 12/2003 | Mulligan ........... H03K 17/9622 345/174 |
| 2004/0137965 | A1 | * | 7/2004 | Park .................... H04M 1/0214 455/575.1 |
| 2004/0160511 | A1 | * | 8/2004 | Boesen ............... H04M 1/0237 348/14.02 |
| 2004/0196267 | A1 | | 10/2004 | Kawai et al. |
| 2005/0012723 | A1 | | 1/2005 | Pallakoff |
| 2006/0012556 | A1 | | 1/2006 | Yoneda et al. |
| 2006/0061543 | A1 | * | 3/2006 | Hamano ............... G06F 3/0338 345/156 |
| 2006/0097991 | A1 | | 5/2006 | Hotelling et al. |
| 2006/0176283 | A1 | | 8/2006 | Suraqui |
| 2006/0211454 | A1 | * | 9/2006 | Park ..................... H04M 1/0214 455/566 |
| 2006/0256092 | A1 | | 11/2006 | Lee |
| 2007/0024594 | A1 | * | 2/2007 | Sakata et al. .................. 345/173 |
| 2007/0135104 | A1 | * | 6/2007 | Suzuki .................. G06F 3/0236 455/414.1 |
| 2007/0236475 | A1 | * | 10/2007 | Wherry ......................... 345/173 |
| 2007/0236618 | A1 | | 10/2007 | Maag et al. |
| 2007/0285404 | A1 | | 12/2007 | Rimon et al. |
| 2007/0291015 | A1 | | 12/2007 | Mori |
| 2008/0062148 | A1 | | 3/2008 | Hotelling et al. |
| 2008/0079697 | A1 | | 4/2008 | Lee et al. |
| 2008/0117185 | A1 | * | 5/2008 | Lee ....................... G06F 1/1622 345/174 |
| 2008/0165136 | A1 | | 7/2008 | Christie et al. |
| 2008/0174564 | A1 | | 7/2008 | Kim et al. |
| 2008/0175564 | A1 | | 7/2008 | Lin |
| 2008/0311963 | A1 | * | 12/2008 | Strawn ................ H04M 1/0235 455/575.1 |
| 2009/0002338 | A1 | | 1/2009 | Kinoshita et al. |
| 2010/0127914 | A1 | | 5/2010 | Maier |
| 2010/0134428 | A1 | | 6/2010 | Oh |
| 2010/0188360 | A1 | | 7/2010 | Joung et al. |
| 2011/0012845 | A1 | | 1/2011 | Rothkopf et al. |

FOREIGN PATENT DOCUMENTS

| | | |
|---|---|---|
| JP | 08-016302 A | 1/1996 |
| JP | HEI11-122682 | 4/1999 |
| JP | 2000-078252 A | 3/2000 |
| JP | 2000-172439 | 6/2000 |
| JP | 2006-163460 | 6/2006 |
| JP | 2007-021022 | 2/2007 |
| JP | 2007-047961 A | 2/2007 |
| JP | 2007-122326 A | 5/2007 |
| JP | 2007-164797 A | 6/2007 |
| JP | 2008-191832 | 8/2008 |

OTHER PUBLICATIONS

Claims as Amended in Response, filed on Apr. 25, 2014, from corresponding Japanese Patent Application No. 2013-111276, 4 total pages.
Decision to Grant a Patent dated Oct. 21, 2014, from corresponding Japanese Patent Application No. 2013-111276, 6 total pages.
International Search Report dated Dec. 9, 2008.
Office Action dated Feb. 26, 2013, from corresponding Japanese Patent Application No. 2007-254851, 4 pages.
Office Action dated Aug. 27, 2013, from corresponding Japanese Patent Application No. 2007-254851 (Statement of Relevance included), 4 total pages.
Office Action issued in Japanese Patent Application No. 2014-232511, dated Sep. 24, 2015, in 5 pages.

* cited by examiner

TOUCH INPUT APPARATUS AND PORTABLE ELECTRONIC DEVICE INCLUDING SAME

CROSS-REFERENCE TO RELATED APPLICATION

This application is a continuation of U.S. application Ser. No. 12/679,666, filed on Mar. 23, 2010, which is a 371 National Stage Application of International Application Number PCT/JP2008/067479, filed on Sep. 26, 2008, which claims priority to Japanese Patent Application Number 2007-254851, filed on Sep. 28, 2007, the contents of which are each incorporated herein by reference in their entireties.

TECHNICAL FIELD

The present invention relates to a touch input apparatus installed in a portable electronic device such as a portable telephone, a digital camera or the like.

BACKGROUND ART

Generally, a portable telephone includes a small potable housing in which a thin display such as a liquid crystal display or the like and a plurality of operation keys such as a numerical keypad or the like are arranged. A wide range of information can be displayed by the display, and a wide range of information can be inputted by operating the operation keys.

Also, in a portable telephone, in order to improve its operability, a touch panel is placed so as to cover a screen of the display, so that, for example, by performing a touch operation of a key image displayed on the display, a function corresponding to the key image can be activated (e.g., Japan Patent Laid-Open 2000-78252).

As shown in FIG. 3, a touch panel 6 comprises a detecting part 61 on an end part of which a lead part 62 projects. The detecting part 61 includes a transparent matrix area A where X value detection lines 63 extending in a Y-axis direction and Y value detection lines 64 extending in an X-axis direction are arranged in matrix, and a nontransparent lead area B comprising a plurality of lead lines 65 extending from the matrix area A in the Y-axis direction to reach the lead part 62. The matrix area A functions as a two-dimensional input apparatus.

In a case where the touch panel 6 is installed in a portable telephone, as shown in FIG. 3, the touch panel 6 is placed so that the matrix area A is superposed on an image display area 41 of a display 4. When the portable telephone is in operation, a plurality of key images are displayed on a screen of the display 4. By performing a touch operation at a position where a certain key image is displayed, obtained are an X value output and a Y value output according to a touch position.

In the touch panel 6 shown in FIG. 3, the lead area B comprising the plurality of lead lines 65 does not function as a two-dimensional touch input apparatus, and therefore, in a case where the touch panel 6 is installed in a portable telephone, the lead area B of the touch panel 6 is covered by a cover panel to expose on a front face only the matrix area A where a two-dimensional output is obtained.

DISCLOSURE OF THE INVENTION

Problems to be Solved by the Invention

However, in small electronic devices such as a portable telephone or the like, the display has a larger screen with recent increase in quantity of information to be displayed, and the number of operation keys increases with multi-functionalization. Therefore, further downsizing of the device is difficult.

Therefore, the present invention is, in a portable electronic device with a touch input apparatus including a touch panel placed on a surface of a display, to provide a touch input apparatus which can decrease a size of the device compared to conventional ones, and a portable electronic device comprising said touch input apparatus while realizing both increasing the size of the display and increasing the number of operation keys.

Means for Solving the Problem

A touch input apparatus according to the present invention comprises a display 4 on a surface of which a touch panel 6 is installed.

The touch panel 6 comprises a detecting part 61 on an end part of which a lead part 62 projects. The detecting part 61 includes a matrix area A where an X value detection line 63 and a Y value detection line 64 are arranged in matrix, and a lead area B where a plurality of lead lines 65 extending from the matrix area A in the same direction as the X-axis detection line 63 to reach the lead part 62 are arranged. A first touch input section is formed by the matrix area A of the touch panel 6, and a second touch input section is formed by the lead area B.

With the above described touch input apparatus, by performing a touch operation on the matrix area A of the touch panel 6, a two-dimensional output (X value output and Y value output) according to a touch position is obtained. Therefore, by displaying on the display a plurality of key images arranged in a two dimensional direction, formed is a first operation key part where information is inputted by performing a touch operation of the key image.

Also, with the above described touch input apparatus, by performing a touch operation on the lead area B of the touch panel 6, obtained is a one-dimensional output (X value output) according to the touch position in a direction crossing the lead line 65. Therefore, by providing one or more key display sections 35 in a one-dimensional direction crossing the lead line 65 so as to cover the lead area of the touch panel 6, formed is a second operation key part where information is inputted by performing a touch operation on the operation part. Here, in the case where there are more than one key display sections 35, by arranging key display sections 35 in an X-axis direction, the touch position can be recognized only by the X value output.

In a particular configuration, a cover panel 33 is placed so as to cover the touch panel 6. On the cover panel 33, a light-transmitting panel section 34 is formed in an area covering the first touch input section of the touch panel 6, and one or more key display sections 35 are provided on a line extending in a direction crossing the X-axis detection line 63 in an area covering the second touch input section.

According to this particular configuration, a plurality of key images displayed on the display 4 can be viewed through the light-transmitting panel section 34 of the cover panel 33. By performing a touch operation of any one key image, a two-dimensional output (X value output and Y value output) according to the position of the key image is obtained. Also, by performing a touch operation of any one key display section 35 of the one or more key display sections 35 provided on the cover panel 33, a one-dimensional output (X value output) according to the position of the key display section 35 is obtained. Here, since the plurality of key display sections 35 are arranged in a direction crossing the X-axis detection line 63, the touch position can be recognized only by the X value output.

A portable electronic device according to the present invention includes a touch input apparatus according to the present invention described above, and by the touch operation of the second touch input section of the touch panel 6, a screen displayed on the display 4 is changed.

Alternatively, an image regarding device operation is displayed on the display 4, and by a touch operation of the second touch input section of the touch panel 6, an operation signal regarding the image displayed on the display 4 is generated.

Effect of the Invention

With the touch input apparatus and the portable electronic device according to the present invention, since the lead area of the touch panel which was not used conventionally is utilized as a second operation key part, a space occupied by the lead area is utilized effectively, and the size of the device can be decreased compared to conventional ones.

EXPLANATION OF REFERENCE NUMERALS

Figure 1:
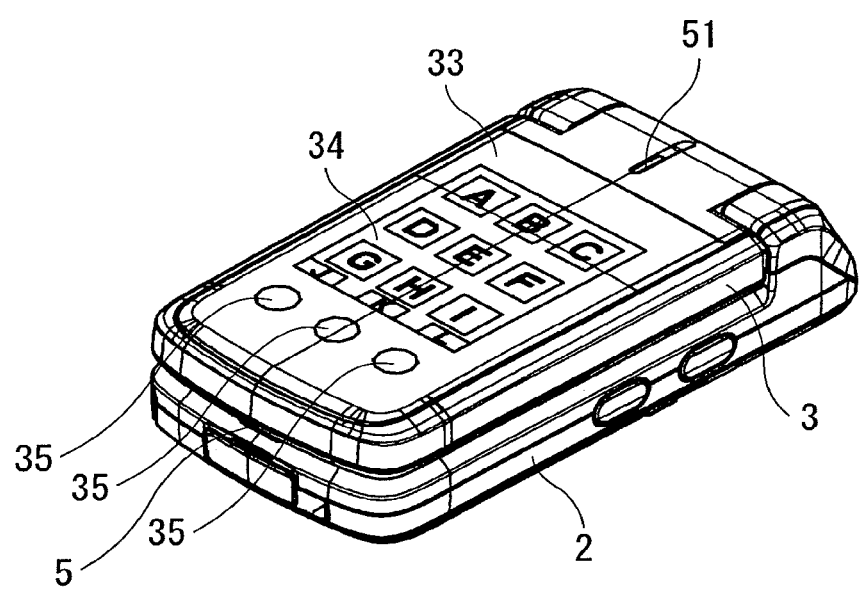
FIG. 1 is a perspective view of a portable telephone according to the present invention.

2 operation side body
3 display side body
33 cover panel
34 light-transmitting panel section
35 key display section
4 sub-display
6 touch panel
61 detecting part
62 lead part
63 X value detection line
64 Y value detection line
65 lead line

BEST MODE FOR CARRYING OUT THE INVENTION

An embodiment in which the present invention is implemented in a portable telephone is to be described in detail below with reference to the drawings.

As shown in FIG. 1, a portable telephone according to the present invention comprises an operation side body 2 and a display side body 3 foldably connected to each other. A plurality of operation keys (not shown) such as a numerical keypad or the like are arranged inside the operation side body 2, and a main display (not shown) including a large screen is arranged inside the display side body 3.

Also, a transmission part 5 is arranged in a lower end part of the operation side body 2, and a receiver part 51 is arranged in an upper end part of the display side body 3.

Figure 2:
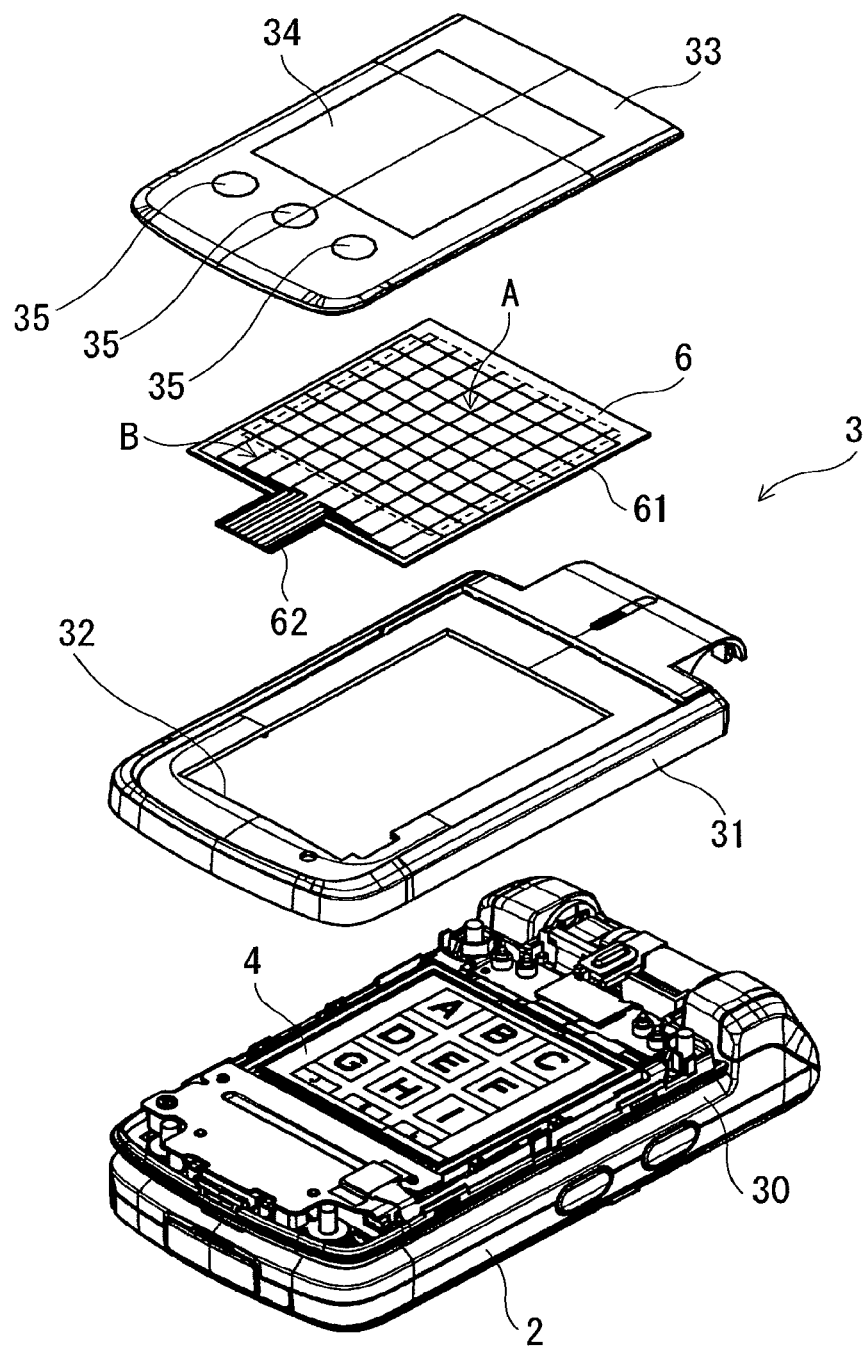
FIG. 2 is an exploded perspective view of a display side body of the portable telephone.

As shown in FIG. 2, the display side body 3 comprises an inner case half body 30 on which a sub-display 4 is mounted, a rear case half body 31 provided with an aperture 32 corresponding to a screen of the sub-display 4, a touch panel 6 placed on the rear case half body 31 so as to cover the screen of the sub-display 4, and a cover panel 33 made of resin placed on the rear case half body 31 so as to cover the touch panel 6.

Figure 3:
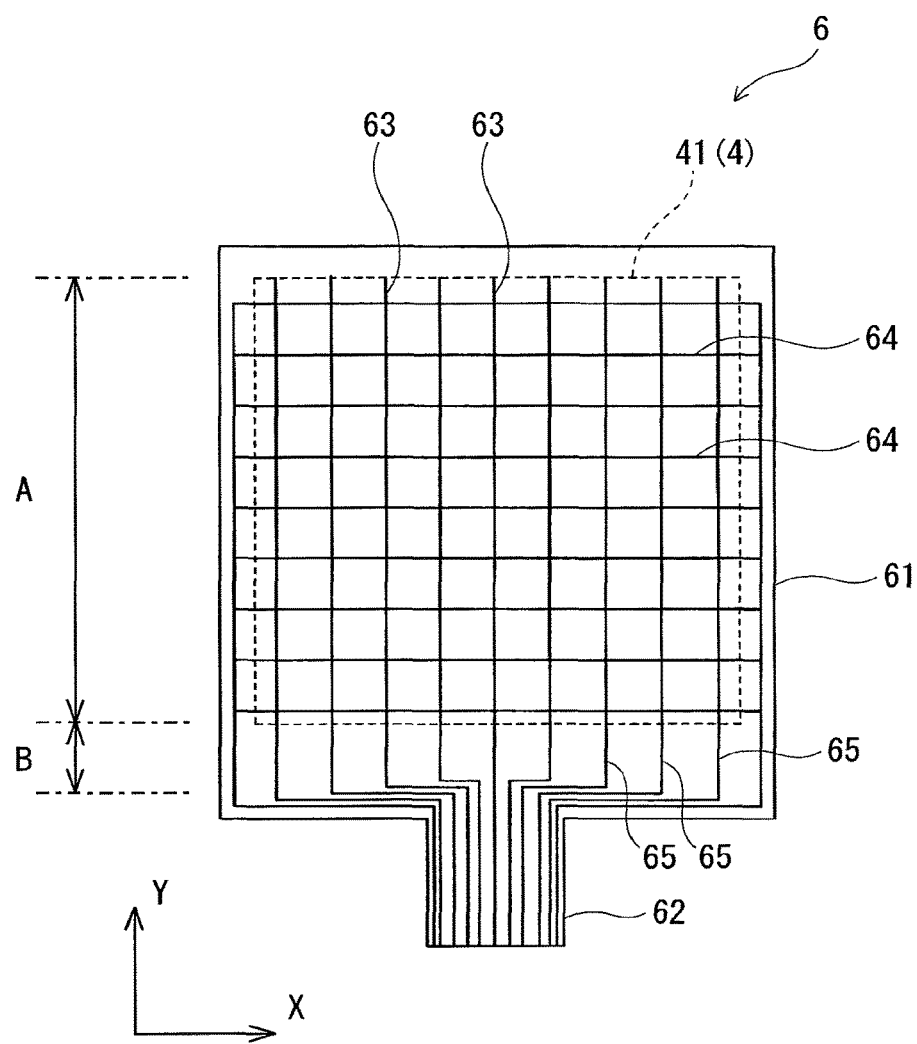
FIG. 3 is a plan view of a touch panel.

As shown in FIG. 3, the touch panel 6 comprises a detecting part 61 and a lead part 62 projecting on an end part of the detecting part 61. A tip end part of the lead part 62 is connected to a circuit board (not shown) on the inner case half body 30.

The detecting part 61 of the touch panel 6 includes a transparent matrix area A where an X value detection line 63 extending in a Y-axis direction and a Y value detection line 64 extending in an X-axis direction are arranged in matrix, and a nontransparent lead area B where a plurality of lead lines 65 extending from the matrix area A in the Y-axis direction to reach the lead part 62 are arranged.

The touch panel 6 is placed so that the matrix area A is superposed on an image display area 41 of the display 4.

In the above described touch panel 6, by touching with a finger-tip an intersection point of the X value detection line 63 and the Y value detection line 64 or a point adjacent thereto, an X value output and a Y value output according to the touch position are obtained, and a Z value output according to the touch operation force is obtained.

When a touch operation is performed on the matrix area A of the touch panel 6, the X value output and the Y value output are stable, and the Z value output has a certain size, too. Therefore, the touch position can be detected from the X value output and the Y value output.

In contrast, when a touch operation is performed on the lead area B of the touch panel 6, the X value output is stable, but the Y value output is unstable. Also, the Z value output is greater than the Z value output when the touch operation is performed on the matrix area A. Therefore, it is recognized that it is a touch operation of the lead area B by an increase of the Z value output, and the touch position in the X-axis direction can be detected from the X value output.

As shown in FIG. 2, a light-transmitting panel section 34 is formed on the cover panel 33 in an area opposed to the matrix area A of the touch panel 6, and a plurality of key display sections 35 aligned in the X-axis direction are provided in an area opposed to the lead area B of the touch panel 6.

When the portable telephone is in operation, a plurality of key images are displayed on a screen of the display 4 (see FIGS. 1 and 2). If a touch operation is performed on the light-transmitting panel section 34 of the cover panel 33 at a position where a certain key image is displayed, an X value output and a Y value output according to the touch position, and a Z value output of a certain size are obtained. Therefore, an operation signal according to the key image on which the touch operation was performed is generated based on the X value output and the Y value output.

Also, if a touch operation is performed on any one key display section 35 of the plurality of key display sections 35 of the cover panel 33, an X value output according to the touch position and a great Z value output are obtained. Therefore, it is determined which key display section 35 has been operated based on the X value output, and an operation signal according to the operated key display section 35 is generated.

Figure 4:
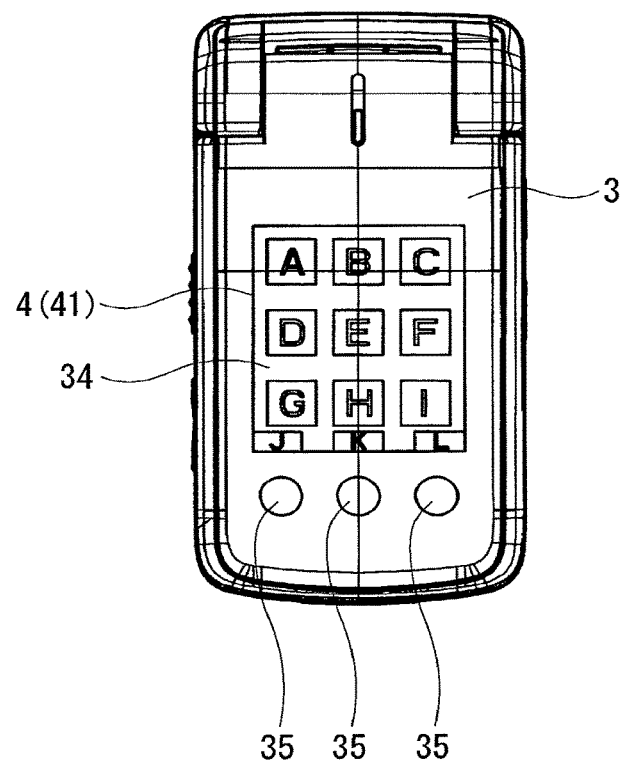
FIG. 4 is a plan view showing an image display example on a sub-display.

For example, as shown in FIG. 4, in the case of scroll-displaying a plurality of operation key images on the image display area 41 of the sub-display 4, by performing a touch operation on one key display section 35 of the plurality of key display sections 35, it is possible to switch the image of a group of operation keys displayed on the image display area 41 to an image of a group of operation keys in which the operation key designated by the key display section 35 on which the touch operation was performed is the first key.

Figure 5:
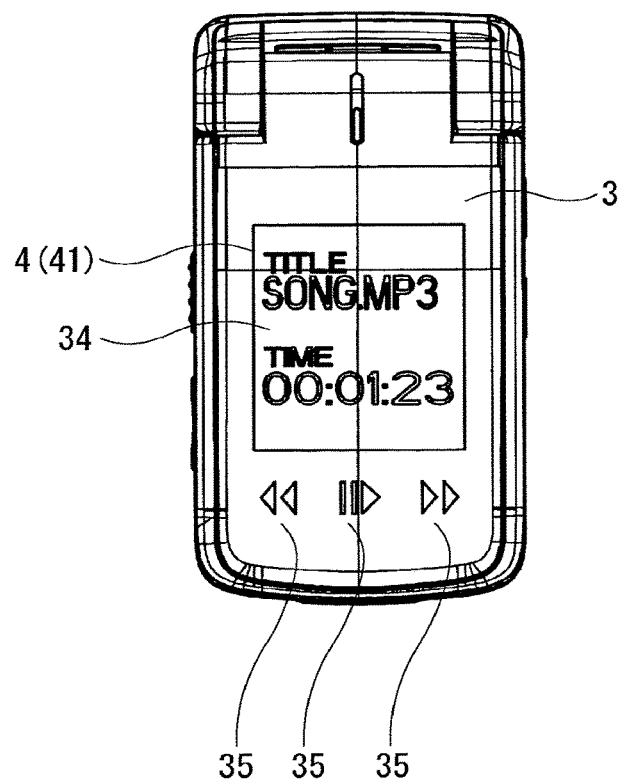
FIG. 5 is a plan view showing another image display example on the sub-display.

Also, as shown in FIG. 5, in the case where a title of and a reproduction time for a music album are displayed on the image display area 41 of the sub-display 4, the operation key regarding the reproduction operation (e.g., start reproduction, forwarding, backward feed, and the like) is shown by the plurality of key display sections 35. By performing a touch operation of any one of the key display sections 35, it is possible to order one reproduction operation designated by the operated key display section 35.

With the portable telephone of the present invention described above, since the lead area B of the touch panel 6 which was not used conventionally is utilized as a second operation part, a space occupied by the lead area B is utilized effectively, and as a result, the size of the portable telephone can be decreased compared to conventional ones.

The present invention is not limited to the foregoing embodiment in construction but can be modified variously within the technical range set forth in the appended claims. In the embodiment described above, the present invention is implemented with respect to the sub display section which is exposed when a foldable telephone is folded. However, as long as a touch panel is included in a main display section which is covered when folded, the present invention can also be implemented with respect to the main display section.

The second operation key part provided in the embodiment described above supplements operation of the indication in the image display area and the operation of the main key operation part. However, in some cases it may be controlled to become unusable in a mode, an application or the like. Thereby it is possible to prevent erroneous operation, and it is not necessary to control to prevent an extra input process from being received to be processed.

Also, in the present invention, it is also possible to use the second operation key part as a main operation part to operate contents displayed in the image display area, so that the first operation key part in the image display area is not used. For example, when simply reproducing music as shown in FIG. 5, it is not necessary to operate in the image display area. Therefore, it is also possible to display information regarding the music (including movie clip, music information, photograph (jacket) or the like) in this display area, and handle simple functions (reproduction, forwarding, backward feed) in this second operation key part, so that the screen is specialized in indication and a touch-input to a large screen is disabled.

The present invention can also be implemented in a sliding portable telephone or a straight type portable telephone as well as a foldable portable telephone, and further, can be implemented in various portable terminal devices such as a digital camera, a game machine or the like as well as a portable telephone.

What is claimed is:

1. A portable electronic device comprising:
    a display area provided on a front surface thereof and separated from other areas of the device, and a second area provided on the front surface and outside the display area,
    the display area being configured to display a plurality of operation-related images arranged in sequence so as to execute a specific function by touch operation, wherein the display area is formed over a first touch detection part, wherein the first detection part comprises a two-dimensional matrix of touch detection lines,
    the second area providing at least one touch-sensitive function key responsive to a touch operation, wherein the at least one touch-sensitive function key is formed over a second touch detection part formed over a plurality of leads that run parallel to each other in only one direction to provide a one-dimensional output in response to a touch operation performed within the second touch detection part according to a touch position in a direction orthogonal to the plurality of leads,
    the display area being configured to display a first display of a first subset of the plurality of operation-related images or a second display of a second subset of the plurality of operation-related images that are not contained in the first subset, and
    the first display being switchable to the second display using a scroll operation in response to an operation of the at least one touch-sensitive function key.

2. The portable electronic device according to claim 1, wherein one of the plurality of operation-related images is rearranged to a top of the sequence by operation of the at least one touch-sensitive function key located in the second area.

3. The portable electronic device according to claim 1, wherein at least some of the plurality of operation-related images and the at least one touch-sensitive function key are adjacent to each other by interposing a boundary between the display area and the second area.

* * * * *